United States Patent
Van Der Woude

(10) Patent No.: US 10,054,054 B2
(45) Date of Patent: Aug. 21, 2018

(54) AIR GUIDING DEVICE AND TURBO ENGINE WITH AIR GUIDING DEVICE

(71) Applicant: Rolls-Royce Deutschland Ltd & Co KG, Blankenfelde-Mahlow (DE)

(72) Inventor: Matthijs Van Der Woude, Rangsdorf (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 345 days.

(21) Appl. No.: 14/847,463

(22) Filed: Sep. 8, 2015

(65) Prior Publication Data

US 2016/0138471 A1    May 19, 2016

(30) Foreign Application Priority Data

Sep. 5, 2014   (DE) .................. 10 2014 217 830

(51) Int. Cl.
*F02C 7/18* (2006.01)
*F01D 11/24* (2006.01)
(Continued)

(52) U.S. Cl.
CPC ............... *F02C 7/18* (2013.01); *F01D 11/24* (2013.01); *F01D 25/24* (2013.01); *F02C 7/185* (2013.01);
(Continued)

(58) Field of Classification Search
CPC ........ F01D 17/105; F01D 11/24; F01D 25/24; F02C 7/18; F02C 7/185; F02C 7/141;
(Continued)

(56) References Cited

U.S. PATENT DOCUMENTS 2,956,585 A * 10/1960 Alsworth ............... B64D 13/08
                                                           137/552
4,418,879 A    12/1983 Vanderleest
(Continued)

FOREIGN PATENT DOCUMENTS

DE           10042933 A1    3/2002
EP            1184552 A2    3/2002
(Continued)

OTHER PUBLICATIONS

European Search Report dated Jan. 18, 2016 for counterpart European Application No. EP15183760.6.
(Continued)

*Primary Examiner* — Audrey K Bradley
*Assistant Examiner* — Kelsey Stanek
(74) *Attorney, Agent, or Firm* — Shuttleworth & Ingersoll, PLC; Timothy J. Klima

(57) ABSTRACT

An air guiding device for an aircraft engine, characterized in that it has at least one valve element which is moveable between a first position, in particular an open position, and a second position, in particular a closed position, wherein in the first position of the at least one valve element, through a combined effect with at least one first air guiding element that is arranged inside the air flow, a cooling air flow can be guided from an air flow into a hollow space between the housing and the core engine of the aircraft engine, and the at least one first air guiding element is aligned at least approximately in parallel to the air flow for the purpose of reducing flow resistance. The invention also relates to an aircraft engine comprising at least one air guiding device.

14 Claims, 11 Drawing Sheets

(51) Int. Cl.
  *F02K 3/115* (2006.01)
  *F01D 25/24* (2006.01)
(52) U.S. Cl.
  CPC ........ *F02K 3/115* (2013.01); *F05D 2260/232* (2013.01); *Y02T 50/671* (2013.01); *Y02T 50/675* (2013.01)
(58) Field of Classification Search
  CPC ........ F02K 3/115; F02K 3/075; Y02T 50/671; Y02T 50/675; F05D 2260/232
  USPC ....... 415/145, 144; 60/226.3, 262, 785, 805, 60/806
  See application file for complete search history.

(56) References Cited

U.S. PATENT DOCUMENTS

| | | | |
|---|---|---|---|
| 5,351,732 A | 10/1994 | Mills et al. | |
| 6,817,189 B2 | 11/2004 | Boeck | |
| 8,408,008 B2 | 4/2013 | Todorovic et al. | |
| 2003/0233834 A1* | 12/2003 | Boeck | F01D 25/14 60/805 |
| 2010/0150700 A1 | 6/2010 | Strecker et al. | |
| 2013/0145744 A1* | 6/2013 | Lo | F01D 17/105 60/226.3 |

FOREIGN PATENT DOCUMENTS

| | | |
|---|---|---|
| EP | 2226473 A2 | 9/2010 |
| EP | 2604837 A2 | 6/2013 |
| WO | WO8202181 A1 | 7/1982 |
| WO | WO9211444 A1 | 7/1992 |

OTHER PUBLICATIONS

German Search Report dated May 13, 2015 for counterpart German Application No. DE 10 2014 217 830.4.

* cited by examiner

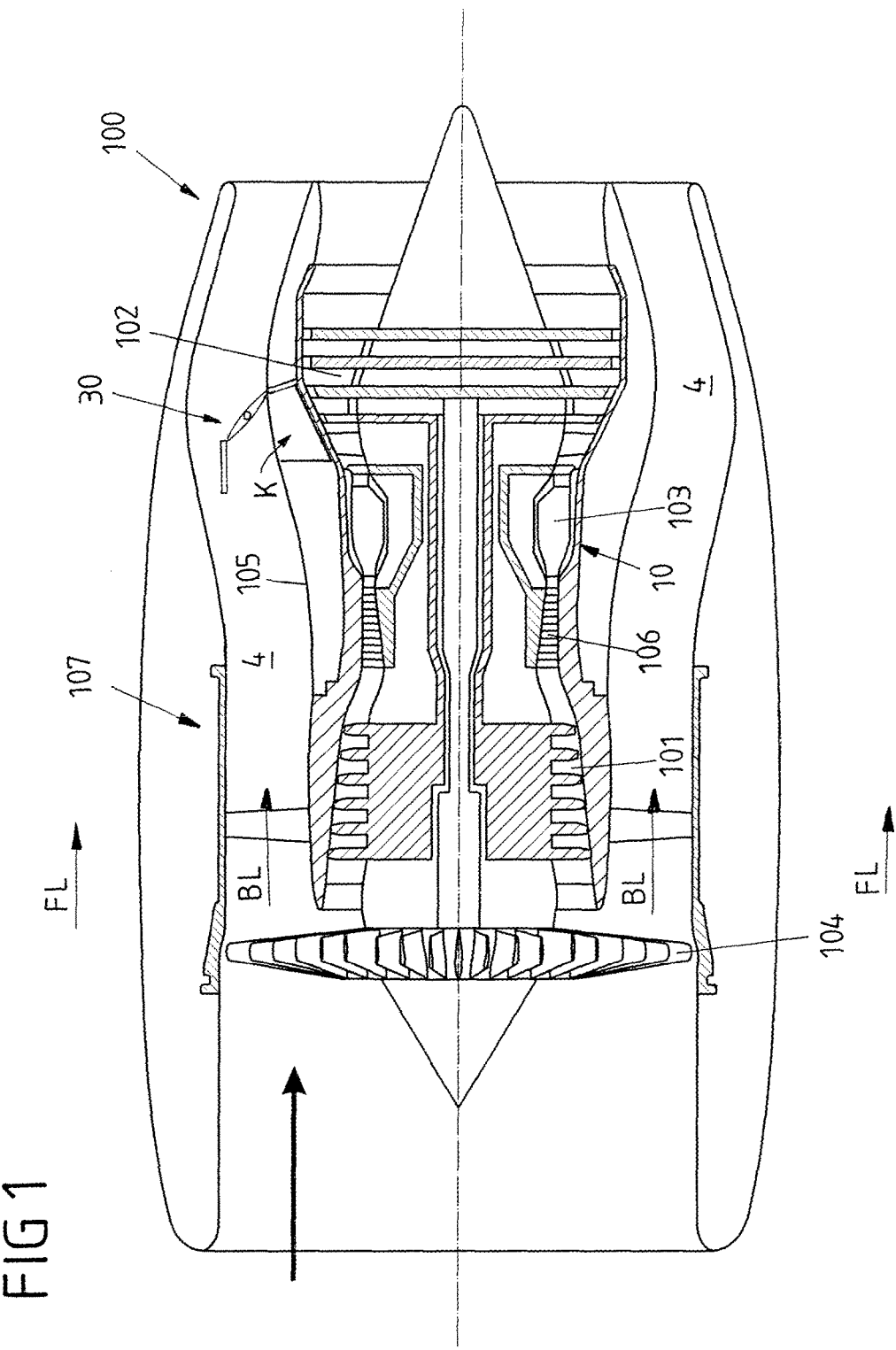

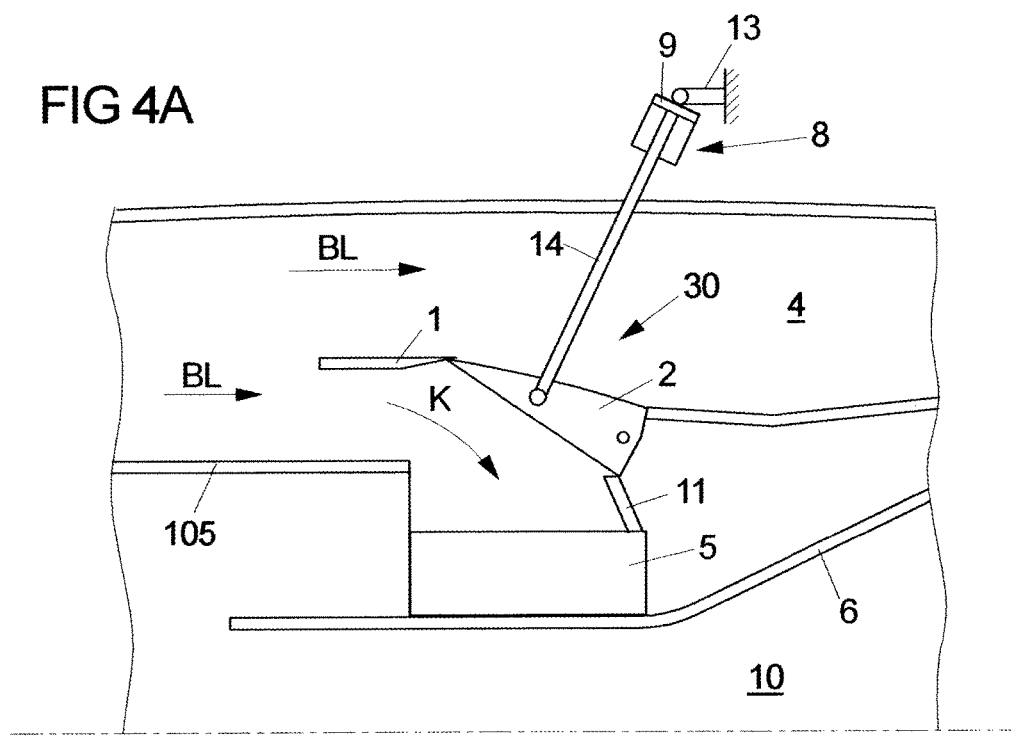
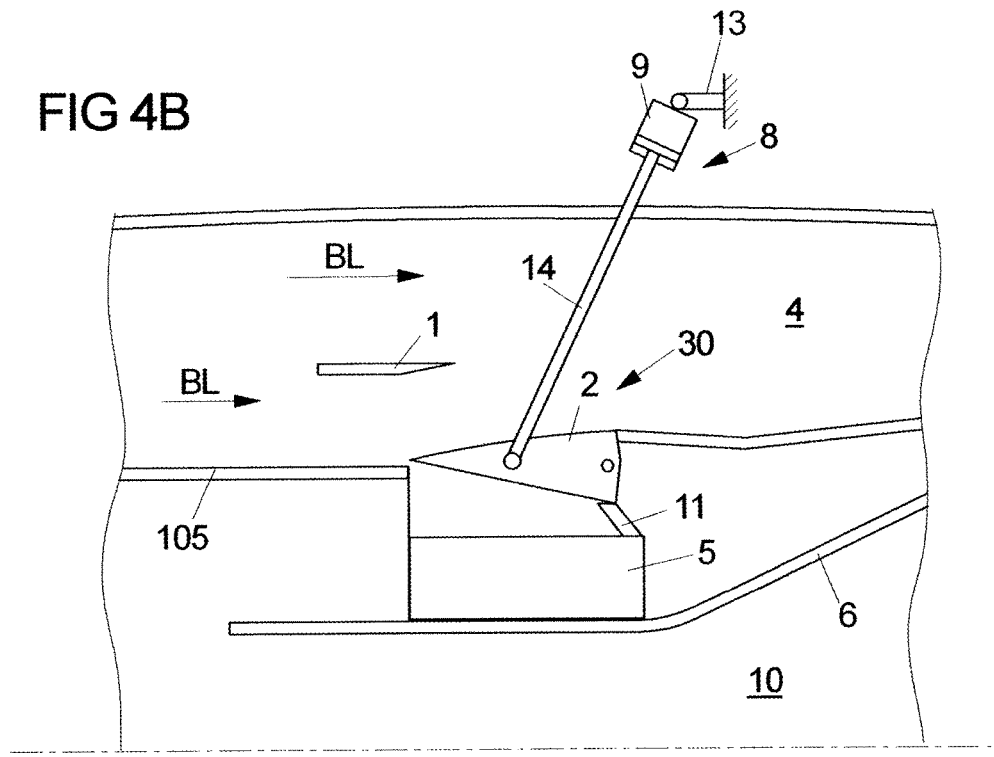

AIR GUIDING DEVICE AND TURBO ENGINE WITH AIR GUIDING DEVICE

This application claims priority to German Patent Application No. 10 2014 217 830.4 filed on Sep. 9, 2014, the entirety of which is incorporated by reference herein.

The invention relates to an air guiding device having features as disclosed herein, as well as to a turbo engine with a bleed air device having features as disclosed herein.

In aircraft engines, thermal management is necessary because the used materials are subjected to high temperatures in many areas. This particularly applies to those walls in the core engine that surround turbines and compressors. Here it is known to use cool air that is present at or in the aircraft engine.

Therefore, it is of interest to facilitate efficient cooling in the aircraft engine.

The objective is solved by a device with features as disclosed herein.

Here, at least one valve element is used, which is moveable between a first position, in particular an open position, and a second position, in particular a closed position, wherein a cooling air flow can be guided from the air flow into a hollow space between the housing and the core engine in the first position of the at least one valve element by means of a combined effect with at least one first air guiding element that is arranged inside an air flow, and the at least one first air guiding element is aligned at least approximately in parallel to the air flow for the purpose of reducing flow resistance.

Since the extraction of the cooling air flow from a bypass duct can be carried out in an efficient manner, the at least one first air guiding element can be arranged inside a bypass duct of the aircraft engine.

In one embodiment, the at least one first air guiding element can be configured so as to be substantially streamlined, wedge-shape, or plate-shaped in order to keep the flow resistance low.

In one embodiment, the at least one valve element is configured substantially as a plate-shaped, wedge-shaped or curved element, so that an efficient design and at the same time an efficient extraction of the cooling air flow is realized. In this way, it also becomes possible, among other things, that in combined effect the at least one valve element in the first position and the at least one first air guiding element form a common air guide surface for the purpose of separating the cooling air flow from the air flow and for guiding the cooling air flow into the hollow space between the housing and the core engine. On the one hand, the combined effect of the valve element and the air guiding element allows for the cooling air flow to be extracted, and on the other hand it facilitates a low-resistance position when no extraction of the cooling air flow takes place.

In another embodiment, for the purpose of enhancing the cooling air guidance, at least one second air guiding element can be provided at the housing of the core engine for guiding the cooling air flow from at least one valve element into the housing around the core engine. This way, the flow transition from the valve element to the hollow space around the core engine can be facilitated.

For the purpose of minimizing the flow resistance even further, in one embodiment the at least one valve element in the second position, in particular the closed position, can be arranged substantially in parallel to the housing of the core engine, or the at least one valve element can be arranged in such a manner that no cooling air flow enters the housing of the core engine in a directed manner.

An efficient actuation of the at least one valve element between the first and the second position is possible through a pneumatic, an electric, a hydraulic valve actuation means and/or a rod assembly, in particular one that is coupled to a guide vane adjustment. When a coupling of the valve element to the guide vane adjustment is present, an energy source provided for that purpose can also be used for adjusting a valve. The hydraulic valve actuation means can work with a fuel as working fluid, for example.

In other embodiments, the at least one valve element can be configured in the manner of a butterfly valve that is arranged in the air flow so as to be pivotable around a rotational axis. Here, the butterfly valve can be pivoted between a first and a second position, in particular between an open position and a closed position.

For an efficient distribution of the cooling air inside the housing of the core engine, in one embodiment the cooling air flow can be guided into a cooling-air manifold inside the hollow space between the housing and the core engine.

Since thermal management is important in the engine, in another embodiment the at least one valve means and/or the at least one first air guiding element can be coupled to a device for active clearance control. The active clearance control serves for keeping the gap between a turbine blade or a compressor blade and a surrounding wall within certain limits. The gap should not become too small, because that would entail the danger of mechanical damage. The gap should also not become too large, as this causes the efficiency level of the aircraft engine to decrease.

The objective is solved by an aircraft engine with features as disclosed herein.

In one embodiment of the aircraft engine, the at least one air guiding device is arranged at the circumference of the core engine's housing. Here, the air guiding devices can always be arranged in a position where a special need for cooling arises in the core engine.

The invention is explained in connection with the exemplary embodiments shown in the Figures. Herein FIG. 1 shows a schematic sectional view through an aircraft engine;

FIG. 4A shows a third embodiment of an air guiding device with a valve element in the first position as the open position;

FIG. 4B shows the third embodiment of the air guiding device with the valve element in the second position as the closed position;

Figure 2A:
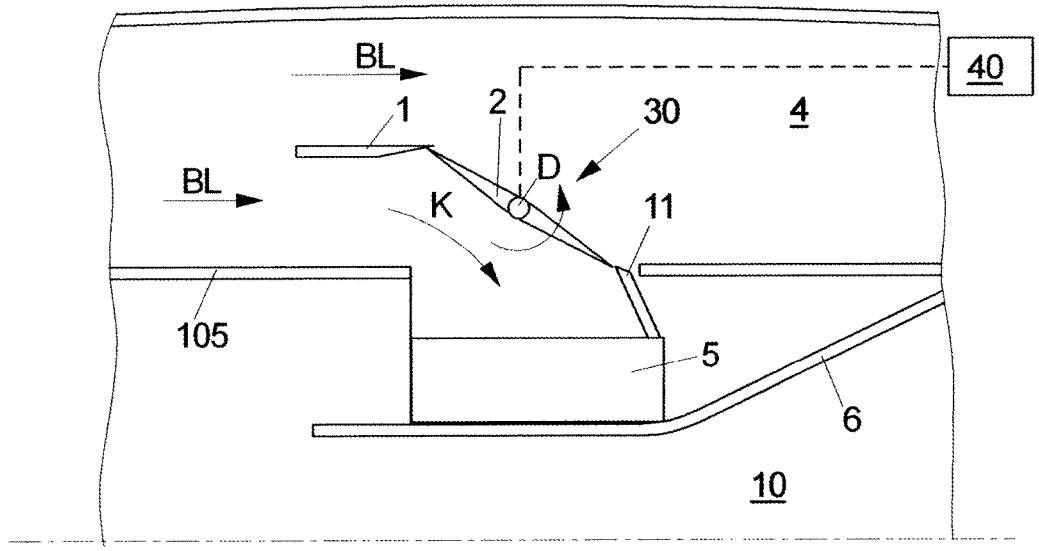
FIG. 2A shows a first embodiment of an air guiding device with a valve element in the first position as the open position.

In FIG. 1, a per se known aircraft engine 100 in the form of a turbofan engine with a core engine 10 is shown, which is surrounded by a housing 105 (also referred to as a fairing).

A free air flow FL externally flows around the aircraft engine 100. Air entering the aircraft engine 100 is slightly compressed by the fan 104 (a low-pressure compressor), wherein the major part of the air BL flows through the bypass duct 4 that surrounds the housing 105 of the core engine 10.

The rest of the entering air is compressed in an intermediate-pressure compressor 101 and a high-pressure compressor 106. Heating takes place in the connecting combustion chambers 103, followed respectively by an expansion in the high-pressure, medium-pressure and low-pressure turbines 102 which are connected to the combustion chambers 103.

The air flow FL around the aircraft engine 100 and the flow BL in the bypass duct 4 are substantially cooler than the air in the core engine 10, so that these air flows FL and BL can be used for cooling purposes in different areas of the aircraft engine 100. Together with the wall of the core engine 10, the housing 105 forms a hollow space inside of which fuel lines are accommodated, for example, and through which a cooling air flow K can be guided.

An air guiding device 30 (shown only schematically in FIG. 1) serves for diverting a cooling air flow K, by which air from the air flow BL in the bypass duct 4 is extracted in the embodiment that is shown here. Alternatively or additionally, the air guiding device 30 could also extract air from the environment of an aircraft engine 100 for the purpose of diverting a cooling air flow K, i.e. from the air flow FL. However, this cooling air flow can only be used for purposes of cooling or ventilating the hollow spaces of the nacelle 107 that surround the bypass duct 4, since the total pressure is too low for ventilating or cooling the circumferential cavity around the core engine 10. This requires an air guiding device 30 in the bypass duct 4.

The three-shaft aircraft engine 100 with the air guiding device 30 that is shown here is to be understood only as an example. The air guiding device 30 for diverting the cooling air flow K can also be used in connection with the aircraft engines 100, which have only one or two compressors 101 or turbines 102, i.e. when a single-shaft or two-shaft aircraft engine 100 is used.

In this case, too, only one air guiding device 30 for diverting the cooling air flow K is shown for reasons of simplicity. In principle, it is possible that several such air guiding devices 30 are arranged, e.g. at the circumference of the housing 105 around the core engine 10.

Figure 2B:
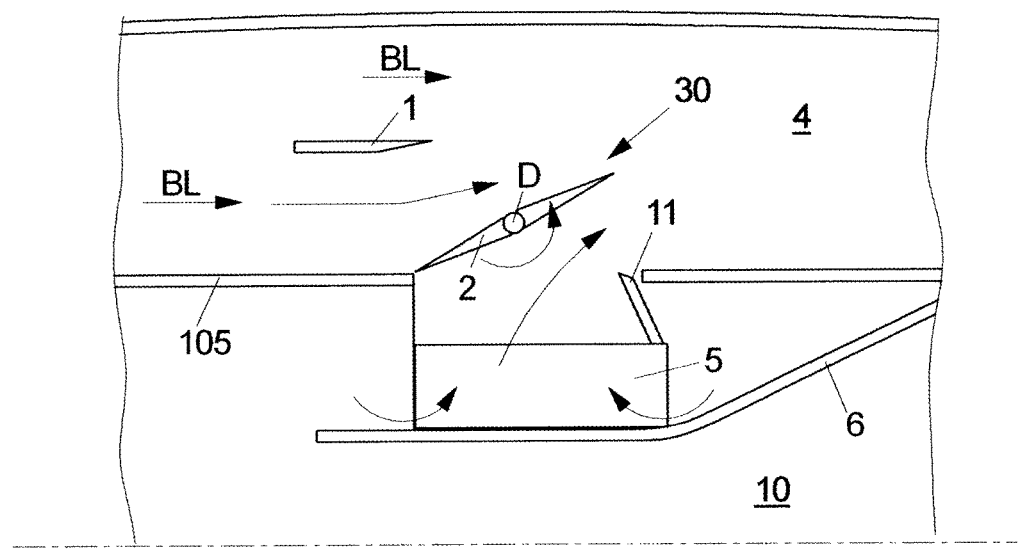
FIG. 2B shows the first embodiment of the air guiding device with the valve element in the second position as the closed position.

In FIGS. 2A and 2B, a first embodiment of an air guiding device 30 is shown. With the air guiding device 30, a cooling air flow K is extracted from the air flow BL that flows through the bypass duct 4, and is then guided into the hollow space between the housing 105 around the core engine 10.

In the first embodiment, this air guiding is achieved through the combined effect of two elements, namely a first air guiding element 1 and a valve element 2.

Here, the first air guiding element 1 is arranged in an air flow BL, wherein the support struts of the first air guiding element 1 are not shown here for reasons of clarity. The support struts can lie e.g. behind and in front of the drawing plane.

Here, the first air guiding element 1 is configured so as to be substantially plate-shaped, so that it has a very low flow resistance. A plate-shaped design in particular also includes a curved plate, since the first air guiding element 1 approximately follows the curvature of the housing 105 of the core engine 10. In an alternative embodiment, the air guiding element 1 can also be configured in the form of a ring section. Here, the radial extension of the air guiding element 1 can be dimensioned in such a manner that the forming boundary layer is not included.

In an alternative embodiment, the first air guiding element 1 is configured as a flow body that is arranged in a streamlined manner in the air flow BL.

In any case, the first air guiding element 1 is aligned so as to be substantially in parallel to the air flow BL in this embodiment, so that the flow resistance is kept low.

Further, the embodiment of the air guiding device 30 has a valve element 2 that can be moved between a first position as the open position (FIG. 2A) and a second position as the closed position (FIG. 2B). In the open position, the cooling air flow K can enter the circumferential cavity between the housing 105 and the core engine 10 in a well-directed manner, which is not possible in the closed position.

In principle, the valve element 2 can be adjusted between a first position and a second position, wherein the first position can be configured in such a manner that more cooling air can enter the housing 105 of the core engine 10 than in the second position, or that a cooling air flow can enter the hollow space between the housing 105 and the core engine 10 in a rather well-directed manner, but to a lesser degree than in the first position.

In the closed position, an opening in the housing 105 of the core engine 10 can be closed (see FIG. 3B), or the air flow BL is guided in such a manner that no cooling air flow K can enter the hollow space between the housing 105 and the core engine 10 in a well-directed manner.

In the first embodiment of FIG. 2A, the valve element 2 is configured as a kind of butterfly valve, i.e. it is configured so as to be substantially plate-shaped or also curved, wherein the valve element 2 can be turned around a rotational axis D. The movement of the valve element 2 is effected by driving a valve actuation means 20 that is not shown here and that provides for a rotation around the rotational axis D.

In the open position (FIG. 2A) the valve element 2 is tilted into the air flow BL in such a manner that the air flow BL impacts the valve element 2. At the same time, in the open position, the top edge of the valve element 2 is arranged close to the first air guiding element 1, or the top edge touches the first air guiding element 1. In this way, the two elements 1, 2 act together in such a way that a common air guide surface is created which is curved in its flow effect (i.e. it is formed from individual plate sections), so that a portion of the air flow BL is guided as a cooling air flow K into the hollow space between the housing 105 and the core engine 10.

It is provided through a second air guiding element 11 that a good conduction of the cooling air flow K into the hollow space between the housing 105 and the core engine 10 is ensured in the transitional area between the bottom edge of the valve element 2 and the housing 105 of the core engine 10.

A cooling-air manifold 5, by means of which the cooling air flow K can be distributed in the circumferential direction around the core engine 10, is arranged within the hollow space between the housing 105 and the core engine 10. In this way, it becomes possible to cool a wall of a turbine housing 6 in a well-directed manner.

The cooling of a turbine housing 6 is useful, e.g. in the context of active clearance control 40 (also called Tip-Clearance Control (TCC)), which is shown here only schematically.

Figure 2C:
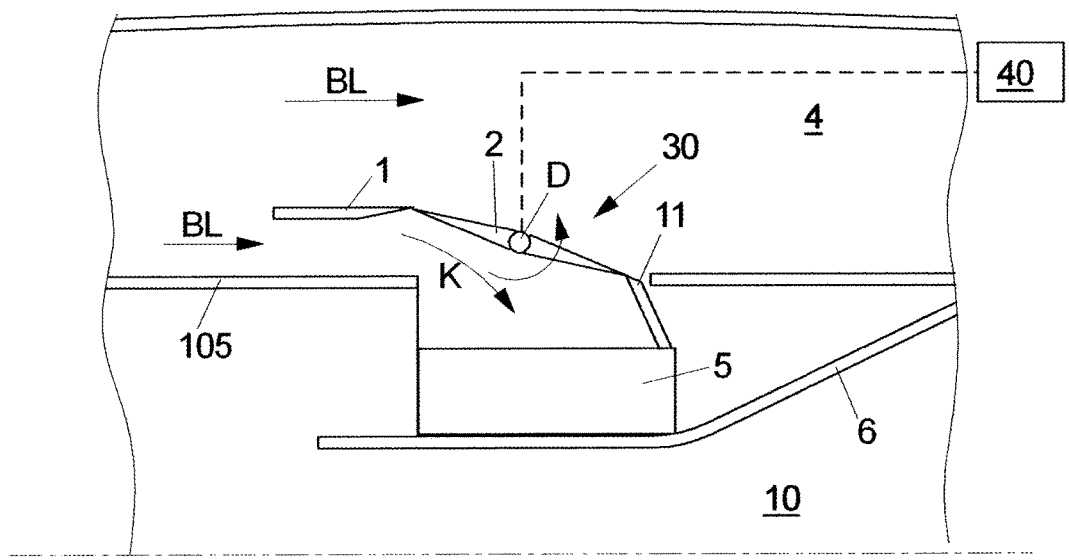
FIG. 2C shows a variation on the first embodiment of an air guiding device with a valve element in the first position as the open position.

An active clearance control 40, which is only shown in FIGS. 2A and 2C for reasons of clarity, can e.g. be a data processing device that can process the measurement data from the turbine and put out corresponding control variables.

Here, the position of the valve element 2 can e.g. be adjusted depending on a temperature that is measured in the turbine 102 or on a measurement of a gap between the blade tip and the wall of the turbine housing 6. If a higher cooling performance is desired, the valve element 2 can e.g. be brought into a position according to FIG. 2A. If a lower cooling performance is required, the valve element 2 can be brought into a position which is approximated to the closed position, as it is shown in FIG. 2B. As has been explained above, it is by all means possible and useful here if the valve element 2 can take an intermediate position between the open position and the closed position, namely the first and second position.

In FIG. 2B, the air guiding device 30 is shown in the closed position, wherein in this position no cooling air flow K is guided into the housing of the core engine 10 in a well-directed manner. The air flow BL can flow back into the bypass duct 4 without any substantial flow obstruction, since the valve element 2 is tilted in such a manner (as shown in FIG. 2B) that the air flow is guided past or around via the opening in the housing 105 of the core engine 10. However, a lower pressure is created through this position under the valve, by which, should this be desired, the air is sucked out of the air collection channel cooling-air manifold 5, i.e. a local reverse ventilation takes place.

Figure 2D:
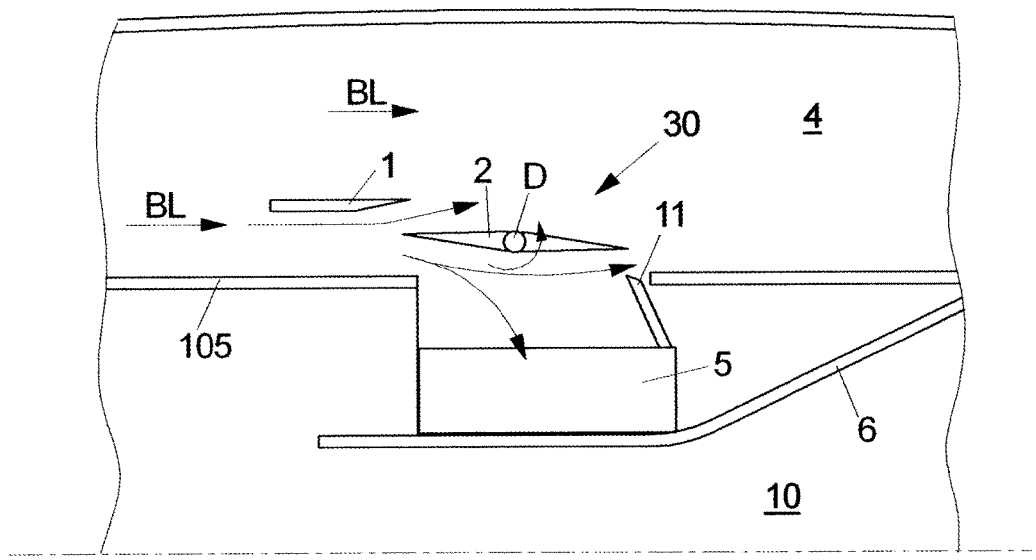
FIG. 2D shows the variation on the first embodiment of the air guiding device with the valve element in the second position as the closed position.

In FIGS. 2C and 2D, a variation on the first embodiment is shown. The difference to the variant as shown in FIGS. 2A and 2B is that the design is more favorable aerodynamically. In the second position (FIG. 2D), the opening in the housing 105 of the core engine 10 is not completely closed, so that a certain minimal cooling air flow K can enter the cooling-air manifold 5. Also, through the horizontal position of the valve element 2, a very low air resistance is achieved in the second position.

Figure 3A:
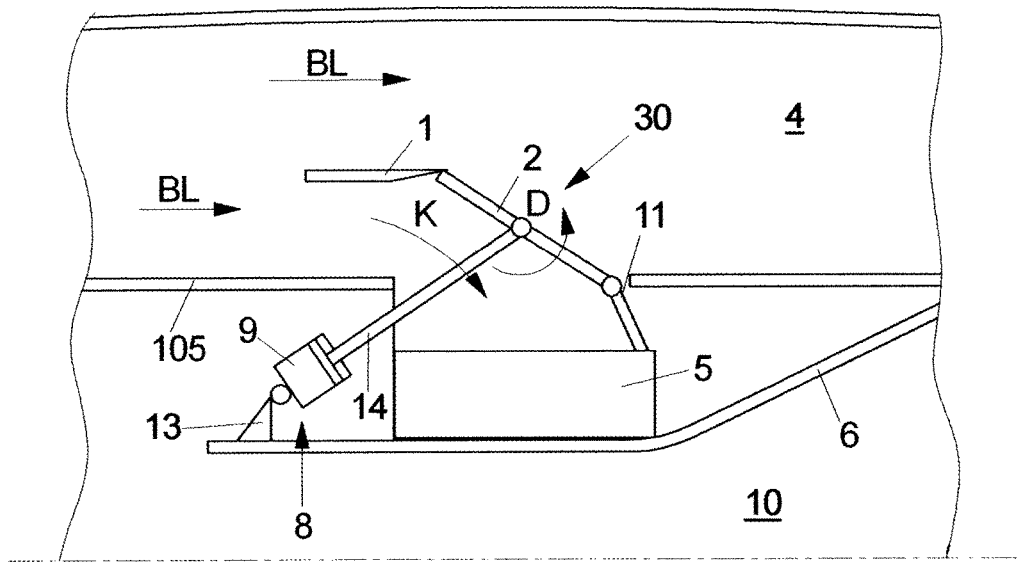
FIG. 3A shows a second embodiment of an air guiding device with a valve element in the first position as the open position.
Figure 3B:
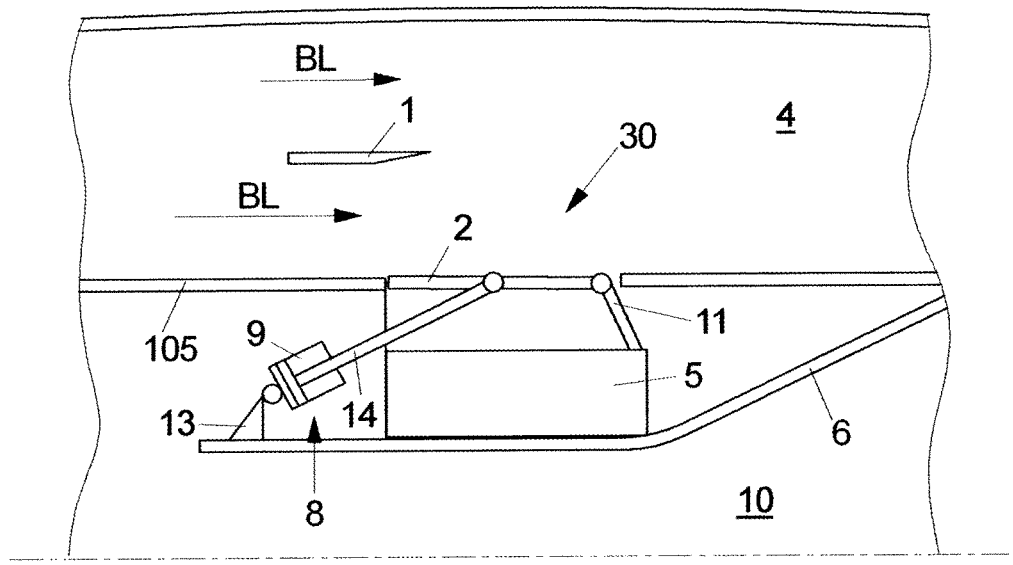
FIG. 3B shows the second embodiment of the air guiding device with the valve element in the second position as the closed position.

In FIGS. 3A and 3B, a second embodiment of an air guiding device 30 is shown, with its basic function, namely the decrease of flow resistance in the air guiding device 30 in the closed position, corresponding to the first embodiment, so that the above description may be referred to.

In contrast to the first embodiment, the valve element 2 is not designed in the manner of a butterfly valve.

Rather, in this case the valve element 2 is embodied as a plate-shaped hinge element that is hinged at the second air guiding element 11. Through a valve actuation means 8, the valve element 2 can be moved between the open position (FIG. 3A) and the closed position (FIG. 3B). In the shown embodiment, a pneumatic cylinder 9 serves for effecting the pivoting movement of the valve element 2. Here, the pneumatic cylinder 9 acts on the valve element 2 via a piston rod 14.

Alternatively or additionally, a hydraulic cylinder or a motor drive can serve for adjusting the valve element 2.

In the third embodiment according to FIGS. 4A and B, the valve element 2 is embodied as a kind of a hinged flap, which, in contrast to the second embodiment, is wedge-shaped and is actuated by a valve actuation means 8. It can be actuated from the exterior wall of the engine shroud, but also from other positions—as is shown in the following exemplary embodiments. Here, too, a pneumatic, hydraulic or electric drive can be used. The hinge point around which the valve element is moved is geometrically arranged in such a manner that an air tightness with the second air guiding element 11 and at the same time the best possible aerodynamic transition to the housing 105 is ensured in every position of the flap.

In FIG. 4A, the open position is shown, in which the cooling air flow K—which is guided through the first air guiding element 1, the valve element 2 and the second air guiding element 11—enters the interior of the housing 105 of the core engine 10 or the cooling-air manifold 5.

In FIG. 4B, the closed position is shown, in which the valve element 2 closes the opening in the housing 105 of the core engine 10.

In this embodiment, the valve element 2 has a wedge-shaped cross-section, with its tip being oriented into the air flow BL. By this means the valve element 2 offers little flow resistance to the air flow BL above the air extraction in the open position. Also in the closed position, the valve element 2 of this embodiment offers little flow resistance, because the air flow BL flows in an aerodynamically smooth manner over the top side of the wedge.

Figure 5A:
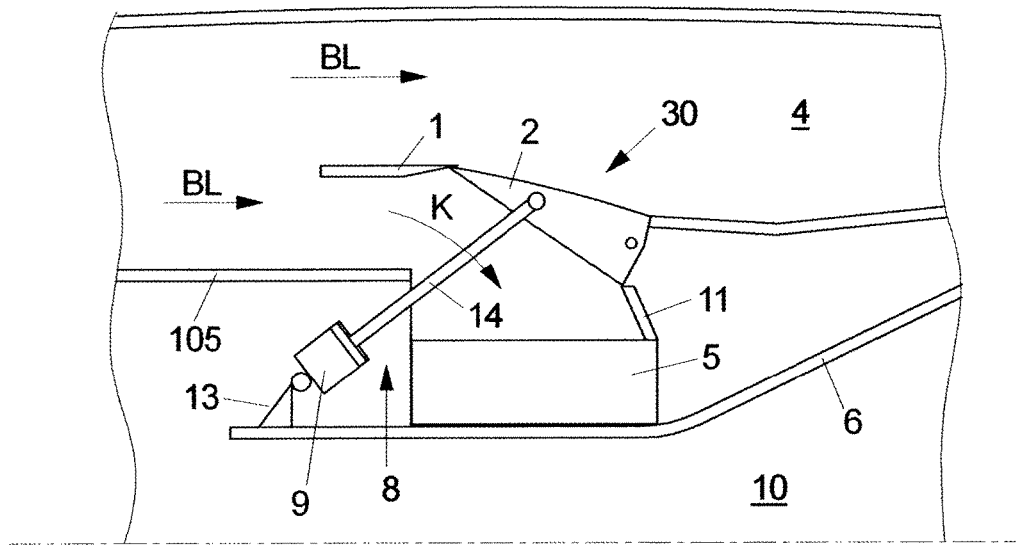
FIG. 5A shows a fourth embodiment of an air guiding device with a valve element in the first position as the open position.
Figure 5B:
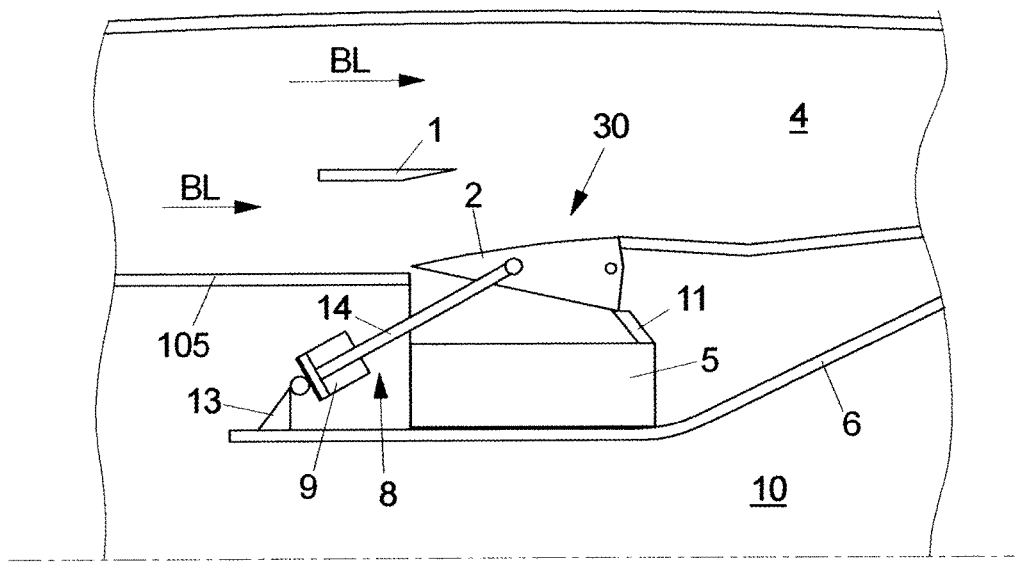
FIG. 5B shows the fourth embodiment of an air guiding device with the valve element in the second position as the locked position.

The fourth embodiment according to FIGS. 5A and 5B is a combination of the second and third embodiment, so that the respective description of the figures can be referred to.

Here, the valve element 2 with the wedge-shaped cross-section comes from the third embodiment. The control of the valve element 2 through the valve actuation means 8, which is pivotably mounted and arranged at the core engine 10 by means of the support device 13 is taken from the second embodiment.

Figure 6A:
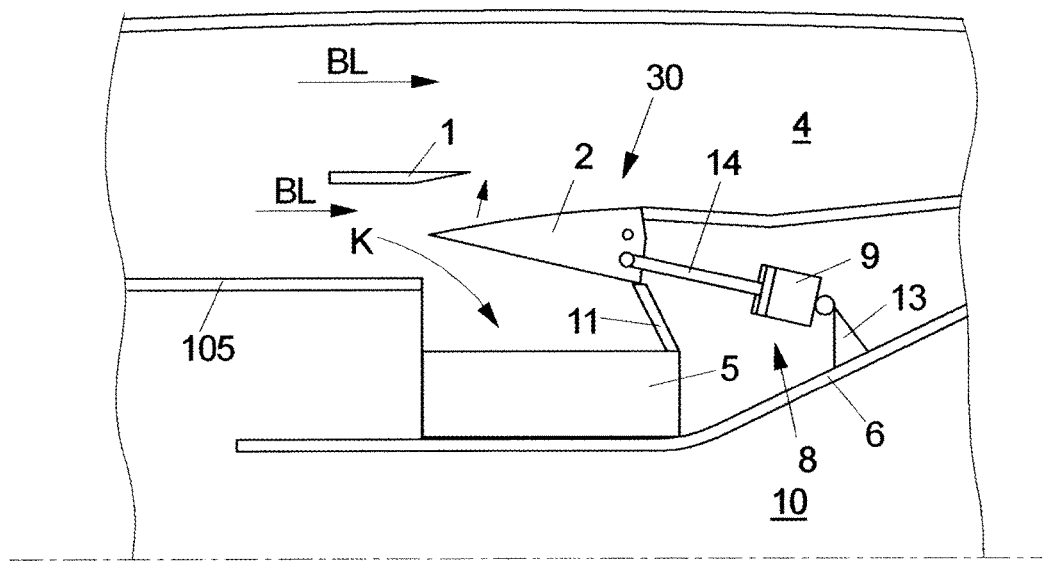
FIG. 6A shows a fifth embodiment of an air guiding device with a valve element in a ⅓ open position.
Figure 6B:
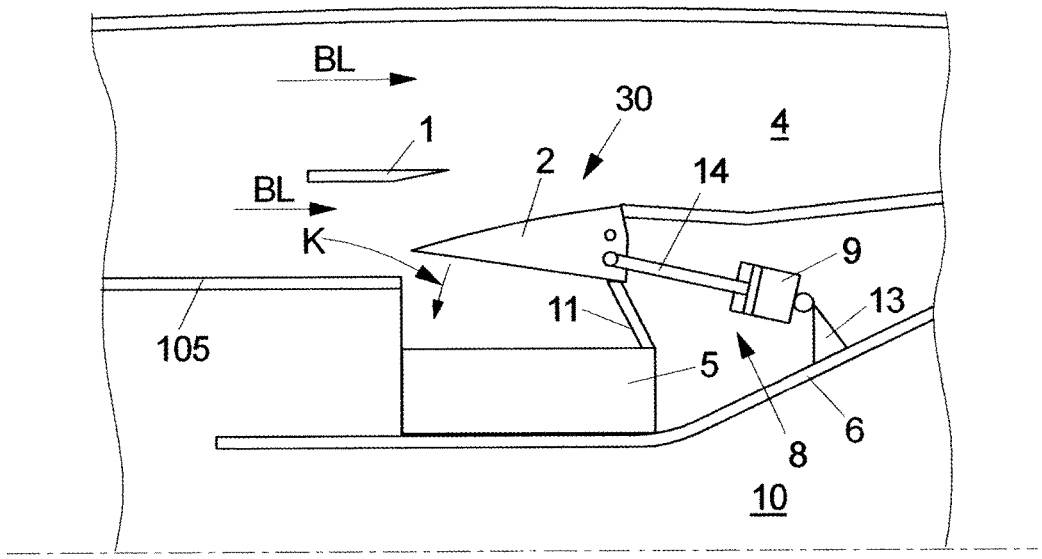
FIG. 6B shows the fifth embodiment of the air guiding device with the valve element in a ⅓ closed position.

The fifth embodiment according to FIGS. 6A and 6B shows another variation on the third and fourth embodiment, wherein a valve element 2 with a wedge-shaped cross-section is used here, as well. The valve actuation means 8 lies behind the valve element 2 here and is pivotably mounted at the housing of the core engine 10, e.g. the turbine housing 6, by means of support device 13. Compared to the lever paths of the second, third and fourth embodiments, the lever path is relatively small here, so that a compact design is facilitated. As for other aspects, reference is made to the description of the other embodiments.

In FIG. 6A, the valve element 2 is shown in a first position, in which the valve is opened by a third; in FIG. 6B a second position, i.e. a third-closed position is taken. This illustrates that the air guiding device 30 can be operated not only in the closed or closed position. In active clearance control, intermediate positions of the valve element 2 can also be important when it comes to adjusting the cooling air flow K in correspondence to a control variable. In each intermediate position of the valve element 2, the air flow BL flows smoothly over the wedge-shaped valve element 2 as the tip of its wedge projects into the flow.

Figure 7A:
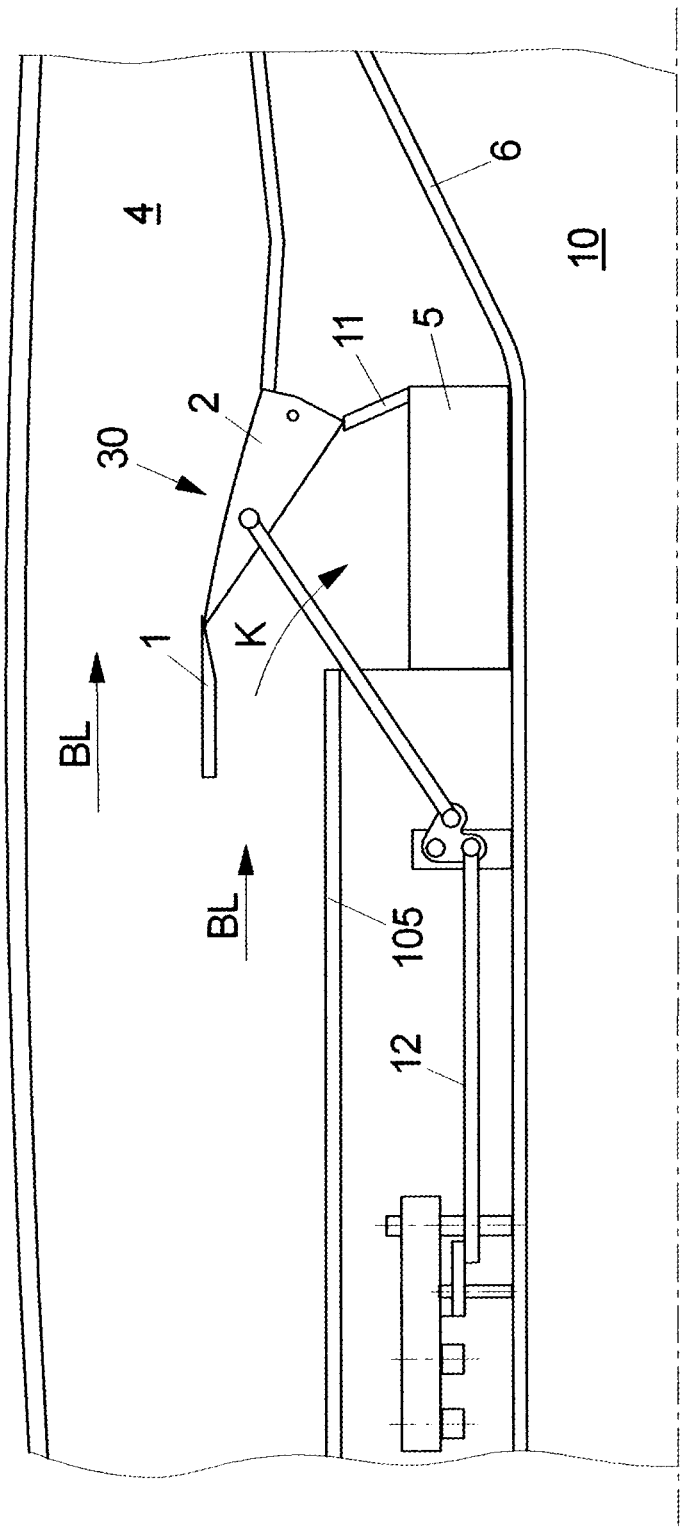
FIG. 7A shows a sixth embodiment of an air guiding device with a valve element in the first position as the open position.
Figure 7B:
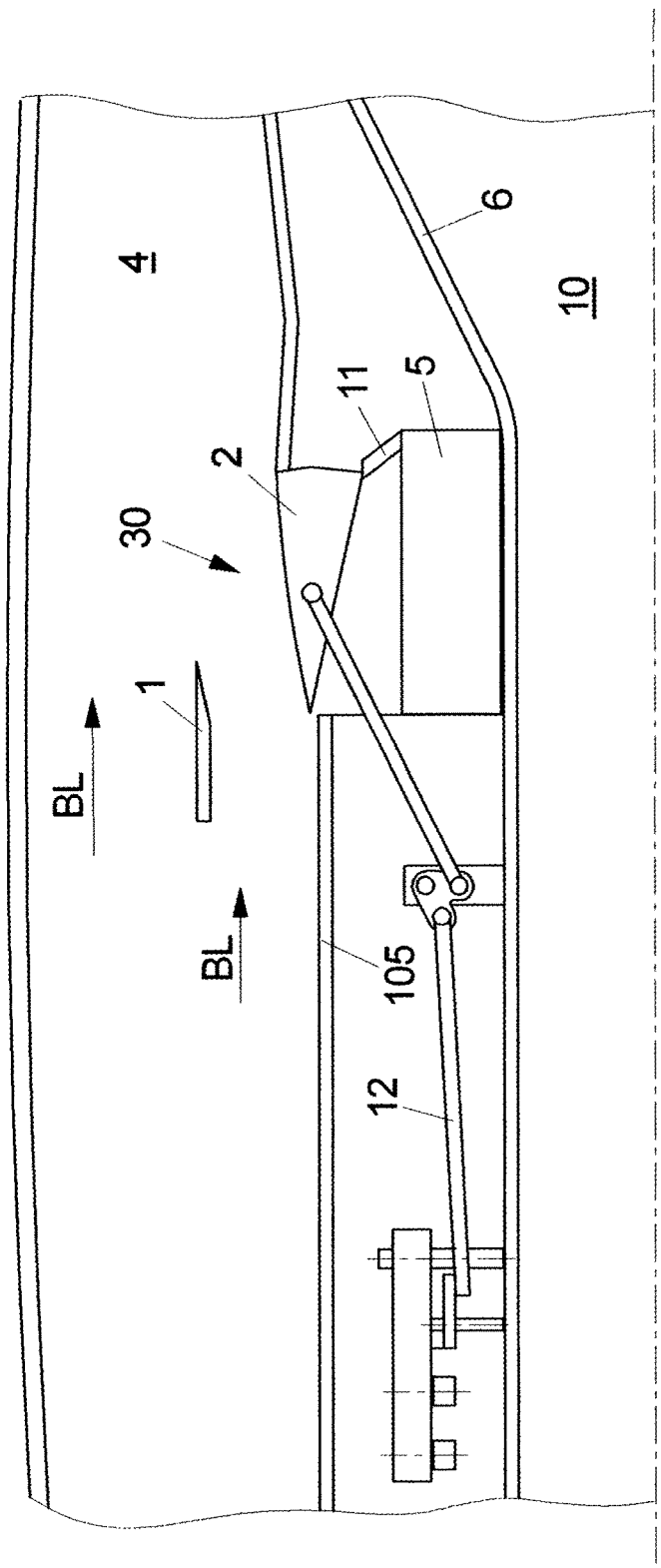
FIG. 7B shows the sixth embodiment of an air guiding device with the valve element in the second position as the closed position.

The sixth embodiment according to FIGS. 7A and 7B is a variation on the fourth embodiment, since here, too, a valve element 2 with a wedge-shaped cross-section is used and the actuation is effected through the valve actuation means 8 from the housing of the core engine 10. However, in this embodiment, control is effected by way of a rod assembly 12 that is mechanically coupled to a guide vane control of the high-pressure compressor 106, which is not shown here in any more detail. This has the advantage that no separate actuation means, like e.g. a pneumatic cylinder 9, has to be used, since the drive can make use of the already existing guide vane control. The rod assembly 12 can be arranged in a space-saving manner inside the hollow space between the housing 105 and the core engine 10.

Figure 8A:
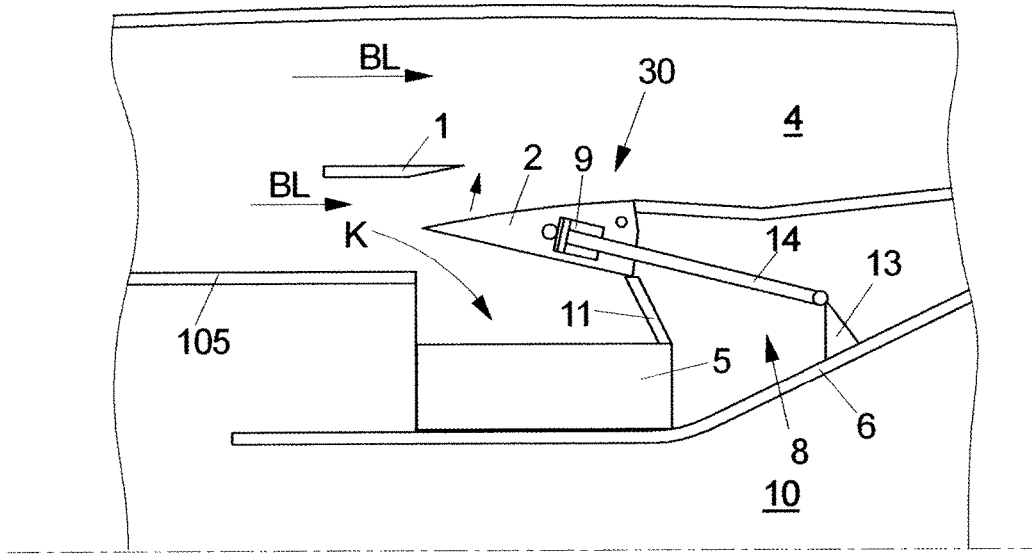
FIG. 8A shows a seventh embodiment of an air guiding device with a valve element in the first position as the open position.
Figure 8B:
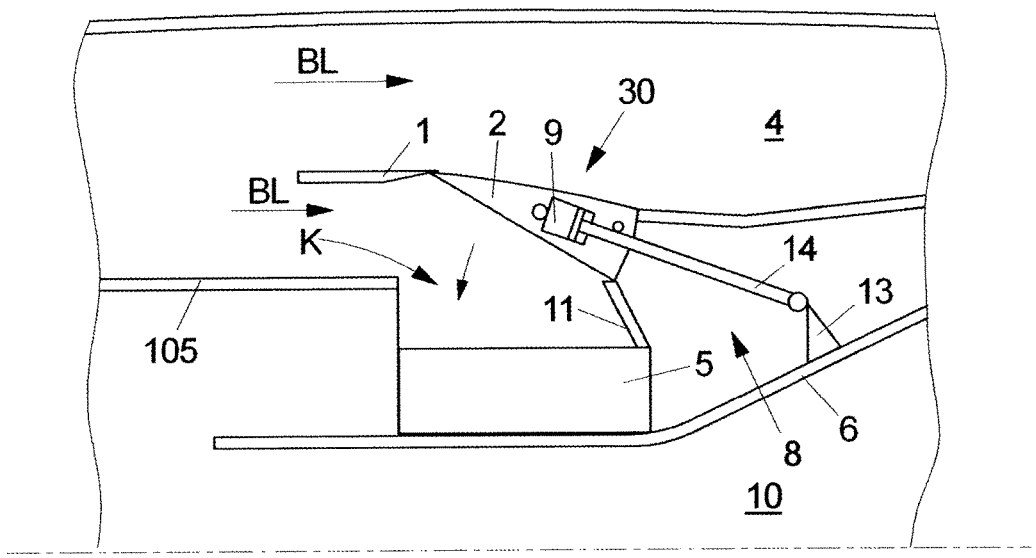
FIG. 8B shows the seventh embodiment of the air guiding device with the valve element in the second position as the fully open position.

The seventh embodiment according to FIGS. 8A and 8B is a variation on the fifth embodiment (FIGS. 6A, 6B), so that it may be referred to the description. Here, the pneumatic cylinder 9 of the valve actuation means 8 is arranged in the interior of the valve element 2 that is designed substantially in a wedge-shaped manner, wherein e.g. the piston rod 14 of the valve actuation means 8 is supported at the wall 6 of the core engine 10. Thanks to the integration of the pneumatic cylinder 9 (or a comparable device) with the valve element 2, a particularly space-saving design is possible. Also, the mass of the valve element 2 is increased through the integration, which results in a higher degree of stability inside the air flow BL. At the same time, the pneumatic cylinder 9 is arranged closer to the air flow BL, which allows for an additional cooling effect of the pneumatic cylinder 9. The basic arrangement of the valve actuation means 8 of this embodiment can also be transferred to other embodiments.

Figure 9A:
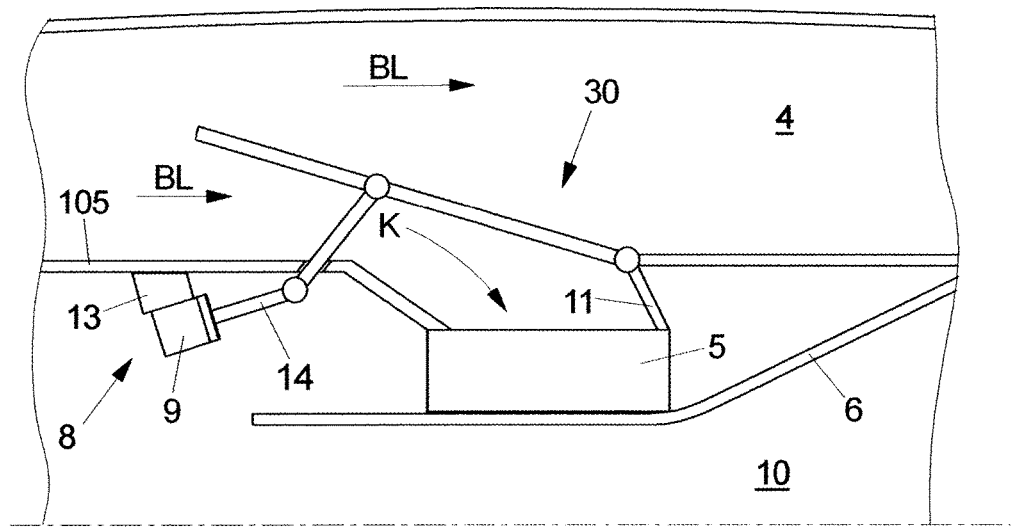
FIG. 9A shows an eighth embodiment of an air guiding device with a valve element in the first position as the open position.
Figure 9B:
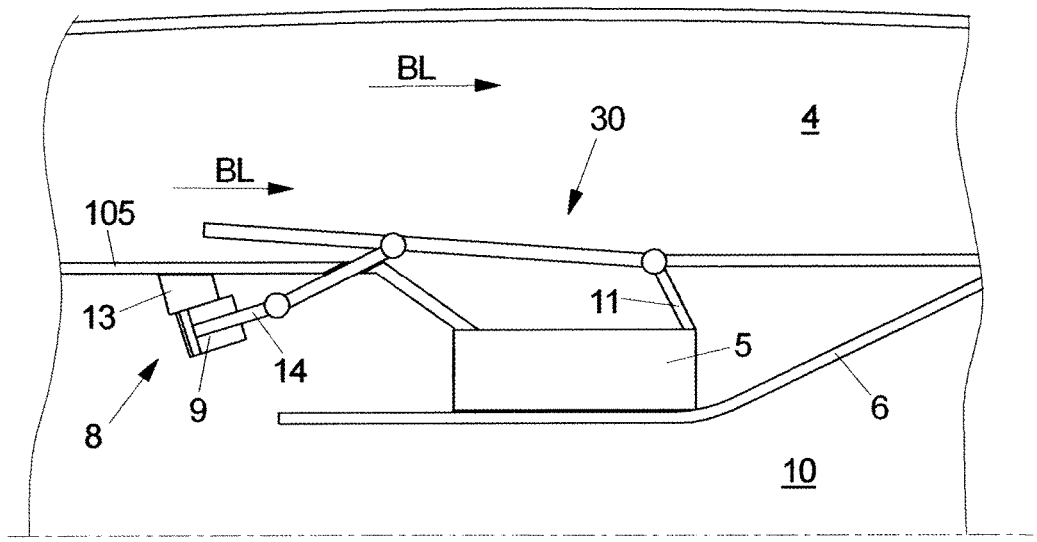
FIG. 9B shows the eighth embodiment of the air guiding device with the valve element in the second position as the closed position.

An eighth embodiment is shown in FIGS. 9A and 9B. Here, the pneumatic cylinder 9 (or a comparable device) is fixedly arranged at a support device 13, which is arranged at the inner surface of the housing 105 of the core engine 10. At its end, the piston rod 14 is provided with a hinge 15, so that a statically determinate drive of the valve element 2 is possible. In FIG. 9A, the valve element 2 is shown in the open position as a first position, and in FIG. 9B in the second position, wherein the closed position is not completely reached here.

In this embodiment, a compact design can be achieved, since the support 13 can be accommodated inside the housing 105 of the core engine 10. In addition, a replacement of the valve actuation means 8 can be carried out in an easy manner, when e.g. a screw-on connection of the support 13 to the housing 105 is released.

The embodiments that are shown here refer to the cooling of a wall of the turbine housing 6. In alternative embodiments, an air guiding device 30 serves for guiding the cooling air flow K into the hollow space between the housing 105 and the core engine 10 in order to cool the wall of a compressor 101 or a wall in the area of a combustion chamber.

Also, the first guide element 1 and the valve element 2 can respectively comprise several elements, which in a combined effect form a guide surface for the cooling air flow K.

PARTS LIST 1 first air guiding element
2 valve element
4 bypass duct
5 cooling-air manifold
6 turbine housing
8 valve actuation means
9 pneumatic cylinder
10 core engine
11 second air guiding element
12 rod assembly
13 support device
14 piston rod
30 air guiding device
40 device for active clearance control
100 aircraft engine
101 intermediate-pressure compressor
102 turbine
103 combustion chamber
104 fan
105 housing of a core engine (fairing)
106 high-pressure compressor
107 nacelle cavity
BL air flow inside the bypass duct
FL air flow around aircraft engine
K cooling air flow

The invention claimed is:

1. An aircraft engine, comprising:
a core engine,
a housing positioned around the core engine,
a hollow space positioned between the core engine and the housing,
a bypass duct,
an air guiding device, comprising:
    at least one first air guiding element arranged inside the bypass duct and having a first air guide surface positioned to be in fluid contact with a bypass air flow in the bypass duct,
    at least one valve element that is moveable between a first open position and a second closed position,
    wherein, in the first open position, the at least one valve element includes a portion positioned adjacent the first air guide surface to form a common air guide surface for separating a cooling air flow from the bypass air flow and guiding the cooling air flow into the hollow space,
        wherein, the at least one first air guiding element is aligned parallel to the bypass air flow to decrease a flow resistance.

2. The aircraft engine according to claim 1, wherein the at least one first air guiding element is at least one chosen from streamlined, wedge-shaped and plate-shaped.

3. The aircraft engine according to claim 1, wherein the at least one valve element is at least one chosen from plate-shaped, wedge-shaped and curved.

4. The aircraft engine according to claim 1, and further comprising at least one second air guiding element positioned at the housing and having a second air guide surface positioned to guide the cooling air flow from the at least one valve element into the hollow space.

5. The aircraft engine according to claim 1, wherein, in the second closed position, the at least one valve element is arranged at least one chosen from parallel to a wall of the housing, such that no cooling air flow or only a minimally required cooling air flow enters the hollow space.

6. The aircraft engine according to claim 1, and further comprising at least one chosen from a pneumatic actuator, an electric actuator, a hydraulic actuator and a rod assembly coupled to a guide vane adjustor connected to the at least one valve element for moving the at least one valve element between the first open position and the second closed position.

7. The aircraft engine according to claim 6, wherein the at least one chosen from a pneumatic actuator, an electric actuator, a hydraulic actuator and a rod assembly coupled to a guide vane adjustor connected to the at least one valve element is at least partially integrated inside the at least one valve element.

8. The aircraft engine according to claim 1, wherein the at least one valve element is a butterfly valve arranged in the bypass air flow to be pivotable around a rotational axis.

9. The aircraft engine according to claim 1, and further comprising a cooling-air manifold positioned in the hollow space into which the cooling air flow is guided.

10. The aircraft engine according to claim 1, and further comprising an active clearance control device coupled to at least one chosen from the at least one valve element and the at least one first air guiding element.

11. The aircraft engine according to claim 1, wherein the air guiding device is arranged at a circumference of the housing.

12. The aircraft engine according to claim 1, wherein a leading edge of the at least one first air guiding element is positioned upstream of a leading edge of the at least one valve element in the bypass duct.

13. The aircraft engine according to claim 12, wherein, in the first open position, a forward portion of the at least one valve element is positioned adjacent the first air guide surface to form the common air guide surface.

14. The aircraft engine according to claim 1, wherein, in the first open position, a forward portion of the at least one valve element is positioned adjacent the first air guide surface to form the common air guide surface.

* * * * *